United States Patent [19]

Cline

[11] 4,141,598
[45] Feb. 27, 1979

[54] TRACK ROLLER ASSEMBLY

[75] Inventor: Lawrence R. Cline, Oswego, Ill.

[73] Assignee: Caterpillar Tractor Co., Peoria, Ill.

[21] Appl. No.: 879,644

[22] Filed: Feb. 21, 1978

[51] Int. Cl.² .......................................... B62D 55/14
[52] U.S. Cl. ........................................ 305/28; 308/18
[58] Field of Search ...................... 305/28, 27, 25, 24, 305/22, 21, 11, 14; 308/18, 163; 74/230.01, 230.3, 230.5; 301/125; 16/46, 45

[56] References Cited

U.S. PATENT DOCUMENTS

| | | | |
|---|---|---|---|
| 2,647,025 | 7/1953 | Deffenbaugh | 305/11 |
| 2,827,339 | 3/1958 | Zunich | 308/18 |
| 3,484,139 | 12/1969 | Danner | 305/27 |
| 3,843,214 | 10/1974 | Piepho | 305/28 X |

FOREIGN PATENT DOCUMENTS 156694 1/1953 Australia ..................... 305/28

Primary Examiner—John P. Shannon
Attorney, Agent, or Firm—Wegner, Stellman, McCord, Wiles & Wood

[57] ABSTRACT

A track roller assembly of the type having a shaft with a track roller journalled thereon and end collars on the ends of the shaft facing the track roller. Keys received in keyways and bolts associated therewith simultaneously prevent relative rotation between the end collars and the shaft and secure the end collars to a track roller frame.

4 Claims, 2 Drawing Figures

TRACK ROLLER ASSEMBLY

BACKGROUND OF THE INVENTION

This invention relates to track roller assemblies such as are used in crawler-type vehicles.

Crawler-type vehicles frequently are operated in extremely hostile environments having uneven terrain. In traveling over such terrain and, particularly when making turning movements, high thrust loads are imposed on the track rollers. In the past it has not been unusual for such high thrust loads to shear the means by which the track roller assemblies are secured to the track frames. Consequently, the track roller assembly will fall off the vehicle, necessitating servicing of the vehicle and preventing its use during such servicing.

Various proposals have been made for the purpose of transferring the high thrust loads encountered by the rollers directly to the track frame without transmitting the load through the securing means by which the track roller assembly is secured to the frame. While such proposals have reduced the severity of the problem, many have not eliminated it entirely and others are somewhat complicated and therefore not as economical as might be desired. And, typically, such structures are more difficult to service than is desired due to their complexity.

SUMMARY OF THE INVENTION

The present invention is directed to overcoming one or more of the above problems.

According to the present invention, there is provided a track roller assembly including a roller shaft having opposed ends. A track roller is journalled on the shaft intermediate its ends and a pair of end collars are provided, one at each end of the shaft. Each end collar has a first face directed towards the roller and a surface remote from the first face configured to mate with a track roller frame at a desired point of attachment thereto. The surface includes a second face in force bucking relation to the first face so that thrust loads are transmitted directly through the end collars to the track roller frame. The surface further includes a third face extending generally axially of the shaft. A thrust washer is interposed between the first face and roller and aligned keyways are located in the end collars and the shaft ends oppositely of the third faces and extend across the shaft axis. Keys are disposed in the keyways for preventing relative rotation between the end collar and the shaft and securing means are provided for simultaneously securing the keys in the keyways and affixing the end collars to a track roller frame, thereby providing a track roller assembly of relatively simple construction and yet capable of withstanding high thrust loads.

Other objects and advantages will become apparent from the following specification taken in connection with the accompanying drawings.

DESCRIPTION OF THE PREFERRED EMBODIMENT

Figure 1:
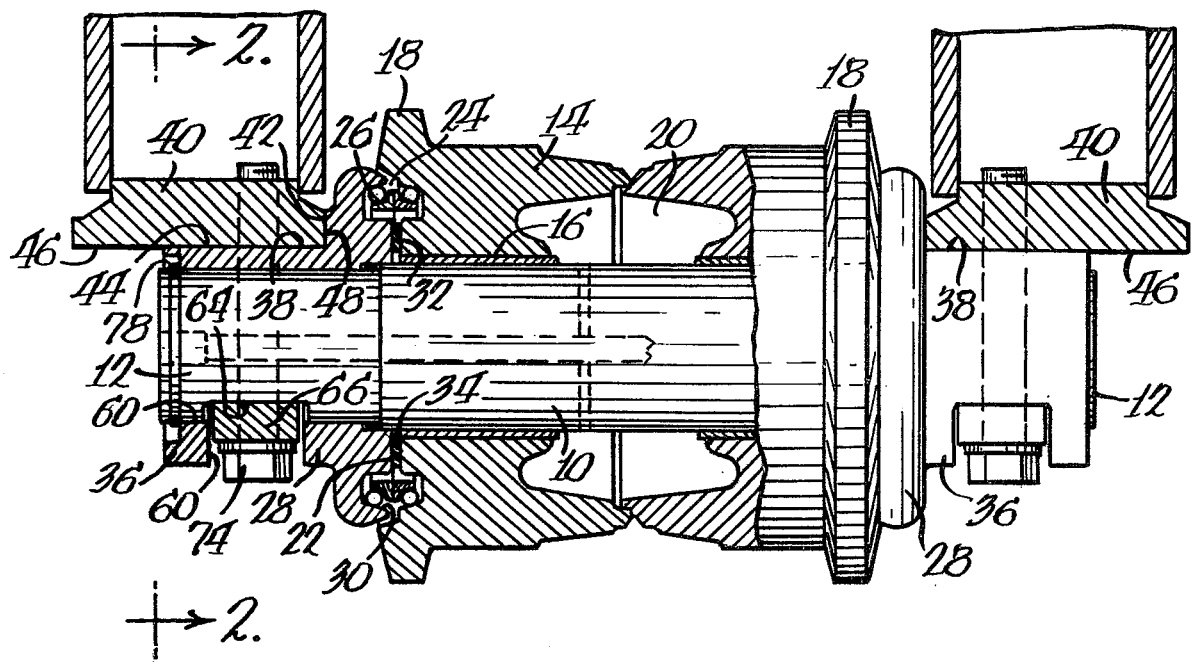
FIG. 1 is an elevational view of a track roller assembly made according to the invention with parts shown in section.
Figure 2:
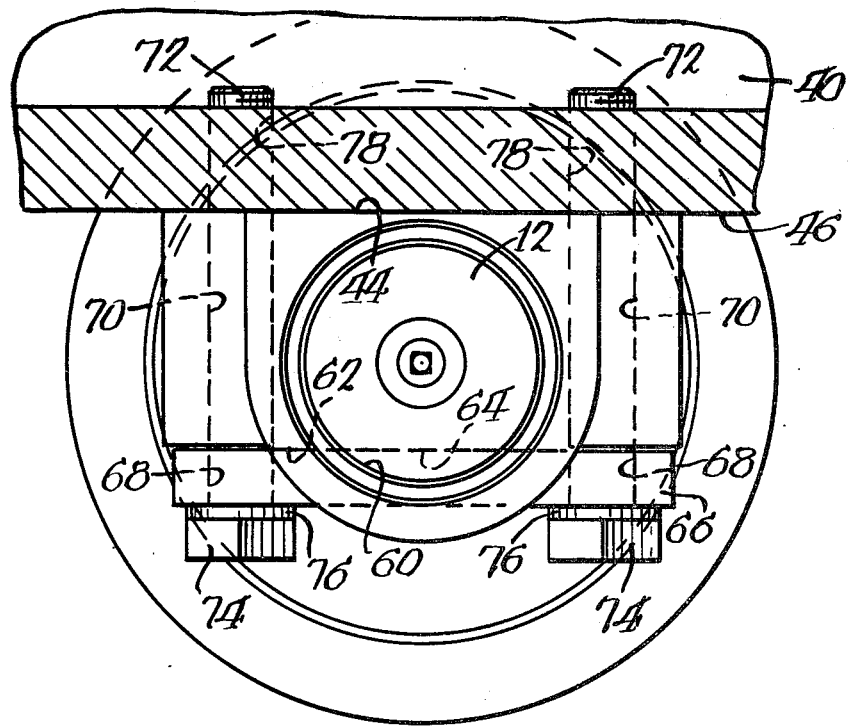
FIG. 2 is a sectional view taken approximately along the line 2—2 in FIG. 1.

A track roller assembly made according to the invention is illustrated in FIG. 1 and is seen to include a roller shaft 10 having opposite ends 12 which are of slightly reduced diameter from that of the portion intermediate the ends of the shaft 10. A track roller 14, which may be of any conventional configuration except as hereinafter specified, is journalled on the shaft 10 intermediate the ends 12 by means of bearings 16. The roller 14 includes radially extending guide flanges 18, as is well known, along with an internal lubricant reservoir 20.

Opposite ends of the roller 14 are provided with circular faces 22. Each of the faces 22 is in a plane transverse to the axis of the shaft 10. Radially outwardly of the faces 22 are annular recesses 24 for receipt of seals 26 of conventional construction.

Each end 12 of the shaft 10 receives an end collar 28. Each end collar 28 includes an annular groove 30 aligned with the corresponding groove 24 and receives the seals 26. Each end collar 28 has a face 32 directed toward the corresponding end of the roller 14 and, specifically, toward the face 22 on the roller. The faces 32 are located transverse to the shaft axis and located radially inwardly of the seal receiving grooves 30 and thrust washers 34 are interposed between the faces 22 and 32 so that thrust generated during operation will be applied to the thrust collars 28.

The end of each thrust collar 28 remote from the face 32 is of reduced diameter as at 36 and is provided with a surface 38 which is adapted to mate with a corresponding one of two parallel rails 40 defining a track frame. The surface 38 includes a face 42 which is in force bucking relationship to the face 32 and in the disclosed embodiment, is in a plane perpendicular to the axis of the shaft 10. The surface 38 includes an additional face 44 which is flat and extends axially of the shaft 10. The surface 44 is in a plane which is parallel to the shaft axis and mates with the lower surface 46 of a corresponding one of the rails 40. Similarly, the face 42 mates with an inner side surface 48 of the corresponding rail 40. As a consequence, thrust loads transmitted to each collar 28 in the manner mentioned previously, are transmitted directly to the rails 40 defining the track frame.

As mentioned previously, each collar 28 is received on a corresponding end 12 of the shaft 10 and to this end, each of the collars 28 is provided with a cylindrical bore 60. Aligned keyways 62 and 64 in the reduced diameter portion 36 of each collar 28 and the reduced diameter ends 12 of the shaft are provided. The keyways 62 and 64 extend transverse to the axis of the shaft 10 and are spaced therefrom. They are disposed diametrically oppositely of the flat face 44 of the collars 28.

An elongated bar or key 66 extends through each set of the aligned keyways 60 and 62 and includes bores 68 at its ends and spaced a distance greater than the diameter of the reduced diameter end 12 of the shaft 10. Bores 70 extend through the end collars 28 perpendicular to the surface 44 and in alignment with the bores 68 for receipt of bolts 72. The bolts 72 have their heads 74 bearing against a corresponding key 66 via hardened washers 76 and extend past the flat face 44 of the corresponding collar 28 to be threadably received in bores 78 in an associated one of the rails 40.

As can be seen in FIG. 1, the width of both the keyways 62 and 64 is slightly greater than the width of the key 66 to aid in alignment of the components as well as to preclude any slight misalignment of the components, when assembled, from resulting in the transmission of thrust loads to the keys 66 which would then impose a bending stress upon the bolts 72.

As a result of the foregoing, it will be appreciated that the bolts 72 simultaneously hold the keys 66 in place to prevent relative rotation between the collars 28 and the shaft 10 and affix the collars 28 to corresponding ones of the rails 40. Thus, only a minimal number of components is required to perform such functions.

Moreover, since the heads 74 of the bolts 72 are exposed, the track roller assembly may be easily serviced by removal thereof with minimal difficulty. In this connection, once the bolts have been removed, the end collars 28 may be easily removed from the shaft ends 12 with minimal effort, requiring only the removal of a spring ring retainer 78 on the extreme end of the shaft 10 if such is utilized.

Important also is the fact that the keys 66 are located on the underside of the shaft 10 to force the shaft 10 upwardly in the same direction as the track roller loads. In prior constructions wherein keys are disposed on the upper side of the shaft, a slightly oversize key results in a poor fit and has acted as a pivot point causing bolt loosening and, in extreme cases, deformation of the shaft 10. These difficulties are avoided with the present invention.

It will therefore be appreciated that a track roller assembly made according to the invention avoids the transmission of thrust loads to the securing means, that is, the bolts 72, which could cause the same to shear. At the same time, the structure is simple, having a minimal number of parts, thereby minimizing cost and the parts are easily accessible to facilitate servicing.

The embodiments of the invention in which an exclusive property or privilege is claimed are defined as follows:

1. A track roller assembly comprising:
a roller shaft having opposed ends;
a track roller journalled on said shaft intermediate its ends;
a pair of end collars, one on each end of said shaft and each having a first face directed toward said roller and extending generally transverse to the axis of said shaft and a surface remote from said first face configured to mate with a track roller frame at a desired point of attachment thereto, said surface including a second face in force bucking relation to said first face and a third face extending generally axially of said shaft;
thrust washers interposed between said first faces and said rollers;
aligned keyways in said end collars and said shaft ends oppositely of said third faces and extending generally transverse to said shaft axis;
keys in said keyways for preventing relative rotation between said end collars and said shaft; and
bolts extending through said keys and past said collars for simultaneously (a) securing said keys in said keyways and (b) affixing said end collars to a track roller frame.

2. A track roller assembly comprising:
a roller shaft having opposed ends;
a track roller journalled on said shaft intermediate its ends;
a pair of end collars, one on each end of said shaft and each having a first face directed toward said roller and a surface remote from said first face configured to mate with a track roller frame at a desired point of attachment thereto, said surface including a second face in force bucking relation to said first face and a third face extending generally axially of said shaft;
thrust washers interposed between said first faces and said roller;
aligned keyways in said end collars and said shaft ends oppositely of said third faces and extending across said shaft axis;
keys in said keyways for preventing relative rotation between said end collars and said shaft; and
securing means for simultaneously (a) securing said keys in said keyways and (b) affixing said end collars to a track roller frame.

3. A track roller assembly comprising:
a roller shaft having opposed ends;
a track roller journalled on said shaft intermediate its ends;
a pair of end collars, one on each end of said shaft and each having a first face directed toward said roller and extending generally transverse to the axis of said shaft and a surface remote from said first face configured to mate with a track roller frame at a desired point of attachment thereto, said surface including a second face generally transverse to said shaft axis in force bucking relation to said first face and a third, flat face extending generally axially of said shaft and parallel thereto, said end collars each having a reduced diameter section including said third face;
thrust washers interposed between said first faces and said roller;
aligned keyways in said end collars and said shaft ends oppositely of said third faces about said shaft axis and extending generally transverse to said shaft axis;
keys in said keyways for preventing relative rotation between said end collars and said shaft and each having bores in their ends; and
bolts extending through said bores and said end collars and past said collars for simultaneously (a) securing said keys in said keyways and (b) affixing said end collars to a track roller frame.

4. A track frame including a pair of generally parallel rails and having flat lower faces and facing side faces and having the track roller assembly of claim 3 mounted therebetween with said third faces mating with said flat lower faces and said second faces mating with said side faces, said bolts being threadably received in said rails.

* * * * *